United States Patent
Kalman et al.

[11] Patent Number: 5,730,188
[45] Date of Patent: Mar. 24, 1998

[54] FLEXIBLE CONDUIT

[75] Inventors: Mark D. Kalman, Panama City, Fla.;
Bin Chen, Houston, Tex.

[73] Assignee: Wellstream, Inc., Panama City, Fla.

[21] Appl. No.: 728,957

[22] Filed: Oct. 11, 1996

[51] Int. Cl.[6] .................................................. F16L 11/04
[52] U.S. Cl. ........................ 138/135; 138/129; 138/130
[58] Field of Search ........................ 138/135, 129–131, 138/133, 134, 144, 172, 174

[56] References Cited

U.S. PATENT DOCUMENTS

| | | | |
|---|---|---|---|
| 712,418 | 10/1902 | Rudolph | 138/135 |
| 1,068,553 | 7/1913 | Abell | 138/135 |
| 1,145,434 | 7/1915 | Pechstein | 138/135 X |
| 1,781,574 | 11/1930 | Frederickson | 138/135 X |
| 4,119,123 | 10/1978 | Samuels . | |
| 4,377,186 | 3/1983 | Genini et al. . | |
| 4,549,581 | 10/1985 | Unno et al. . | |
| 5,259,418 | 11/1993 | Hamrick | 138/135 X |
| 5,261,462 | 11/1993 | Wolfe et al. . | |
| 5,275,209 | 1/1994 | Sugier et al. | 138/135 |
| 5,284,185 | 2/1994 | Kanao . | |
| 5,316,047 | 5/1994 | Kanao . | |
| 5,385,174 | 1/1995 | Kanao . | |
| 5,406,984 | 4/1995 | Sugier et al. | 138/135 |
| 5,553,976 | 9/1996 | Korsgaard . | |

FOREIGN PATENT DOCUMENTS

| | | |
|---|---|---|
| PCT/FR90/ 00497 | 1/1991 | France . |
| 199185 | 6/1908 | Germany ................ 138/135 |

*Primary Examiner*—Patrick F. Brinson
*Attorney, Agent, or Firm*—Browning Bushman

[57] ABSTRACT

A flexible conduit formed by a helically wound band of metal that resists burst pressure. The band has a leading edge hook and a trailing edge hook that engage and interlock. The cross-section of the band has a radially asymmetrical Z-shaped profile. When the band is helically wound, the downstream hook of one turn of the band is received in the upstream valley of the previous turn of the band so that the downstream and upstream hooks form an interlock holding the windings together. In the wound configuration, the thickness of the profile between the upstream valley and the internal surface of the tube is greater than the thickness of the profile between the downstream valley and the external surface of the tube to provide greater material thickness to reduce contact stress at the hook and valley interface and to reduce alternating stresses in the valley corners. The outer surface of the profile tapers towards the center of the tube to direct externally applied radial compression forces toward the thickest section of the profile. A multilayer conduit employing the band may include a central, helically wound collapse-resistant layer disposed within a flexible fluid barrier that in turn is disposed within the tube formed by the band. The conduit may be wrapped with one or more tensile strength layers, anti-wear layers, and additional fluid barriers.

23 Claims, 1 Drawing Sheet

FLEXIBLE CONDUIT

BACKGROUND OF THE INVENTION

1. Field of the Invention

The present invention relates generally to the construction of flexible conduits used to convey fluids. More particularly, the present invention relates to the construction of flexible flow lines with improved resistance to bursting.

2. Brief Description of the Prior Art

A specific form of the present invention relates to flexible pipe of the type generally constructed as a multilayer conduit that is used for high pressure conveyance of oil and gas in offshore applications. The pipe generally comprises polymeric or elastomeric layers that seal the conveyed fluid from the external environment, such as seawater or air, and metallic layers that are either interlocked or multiply stranded to permit flexibility while resisting internal and external pressure loading. In a typical flexible pipe of this type, a "hoop strength layer" is employed for high pressure applications to reinforce the fluid barrier and prevent radial expansion and burst under high differential pressure conditions acting across the pipe wall. The hoop strength layer is formed of one or more helically wound interlocked bands that permit the pipe to be bent with the gap between adjacent turns in the wrapped bands remaining sufficiently small to prevent rapture of the underlying fluid barrier due to internal pressure loading. The bands typically interlock with a lip or "hook" at the edge of the band mating with a recess or "valley" in the adjacent band winding.

In dynamic service, where the flexible conduit is employed, for example, as a riser in floating production applications, there is cyclical relative movement between adjacent windings in the hoop strength layer. The internal pressure loading and external force on the hoop strength layer produce a bearing force at the hook-valley interface between the interlocked windings. The relative movement between adjacent windings and the contact pressure cause wear at the interface and produce fatigue at the stress concentration points of the cross-section, particularly at the corners of the valleys, and especially in extremely high pressure applications. This wear and cyclical stressing can produce metal loss and fatigue that can limit the service life of the flexible pipe structure.

Flexible conduits have been formed by helically winding metal bands with a symmetrical S-shaped profile to form the burst-resistant layer of the conduit. These bands typically include a cross-sectional profile that has a hook configuration along the edges of the band such that when the band is helically wound to form a tubular body, the hooks in adjacent turns interlock to prevent displacement of the bands from each other along the axis of the tube being formed. In the use of a flexible conduit employing a symmetrical S-shaped profile, it has been noted that the wear and cyclic stressing imposed on the conduit can cause failure of the band, usually at defined locations where stress concentrations and wear contacts are primarily evident. As used herein, the term "radially symmetrical" means the condition of having similar parts regularly arranged around a central axis. Where the term "symmetrical" is used alone herein, it is intended to refer to radial symmetry. The term "asymmetrical," used alone herein, is intended to mean not having similar parts regularly arranged around a central axis.

International Patent Application No. FR 9000497 (International Publication No. WO 91/00467) describes the use of cooperating, helically wound bands that avoid the wear and concentration of some of the stresses found in a conduit wound from a single band with a symmetrical S-shaped profile. The referenced prior art, however, requires the use of two separate bands having different, but symmetrical, profiles to provide the burst pressure layer of the conduit. The differing profiles are required to lock the symmetrical bands together. While the two-band construction technique reduces some of the problems associated with the use of a single symmetrical S-shaped band, the technique for forming the hoop strength layer is less desirable than that of using a single profile, self-linking band because of the added complexity of simultaneously winding two bands with dissimilar profiles, as well as the additional cost of constructing bands with differing profiles.

SUMMARY OF THE INVENTION

In accordance with the teachings of the present invention, the bands employed for forming the hoop strength layer of a flexible conduit are made with an asymmetrical Z-shaped profile that is less subject to wear and fatigue in dynamic applications. The cross-section of the band has a valley area of increased thickness as compared with the valley of a symmetrical S-shaped profile to resist twisting and provide a greater resistance to the contact stress imposed by the interlocking trailing hook of the adjacent winding turn. The result is a reduction in overall and alternating stresses during the bending movement of the conduit, as well as an increase in resistance to wear-induced failure. The outer surface of the asymmetrical Z-shaped profile of the band is tapered to isolate a portion of the profile from externally applied compressive forces and to direct such forces to the thicker, main body section of the profile. The asymmetrical design improves the service life of the profile by protecting the material of the band from wear and fatigue-induced stress failures. The increase in the thickness of the profile in the area where stress is induced from the trailing edge of a succeeding turn of the band inherently strengthens the band at the points of stress application and wear. Additionally, as compared with a symmetrical S-shaped profile, the asymmetrical Z-shaped profile moves the point of application of the contact stress further from the centerline of the conduit to reduce the twist and effectively reduce the net resultant compressive force applied to the profile by the overlying trailing edge of the adjacent winding. Increasing the thickness of the profile in the location of highest local stress also permits the construction of higher pressure, larger diameter applications than possible with a conventional, symmetrical S-shaped configuration.

From the foregoing, it will be appreciated that a primary object of the present invention is to provide an improved band profile for a helically wound tubular body in which the contact stresses at the interface between the hook and the valley area of adjacent interlocking bands are reduced to reduce wear and alternating stresses in the corners of the valley.

Another object of the present invention is to provide a single profile band having a cross-sectional profile that is dimensioned to increase the wear resistance and strength of the band in the areas of maximum stress concentration, and minimize the application of stresses to the other sections of the profile.

A general objective of the present invention is to provide a helically wound hoop strength layer in a flexible pipe that provides increased resistance to radial expansion and pressure differentials across the wall of the conductor, that extends the life of the conduit, and that can be economically constructed with bands having a single profile.

Another object of the present invention is to provide a flexible hoop strength layer for a conduit that is formed from one or more simultaneous wraps of bands having only a single profile to eliminate the need to simultaneously wrap bands of differing profiles together.

These, as well as other features, objects, and advantages of the present invention, will be more fully appreciated and understood by reference to the following drawings, specification, and claims.

DESCRIPTION OF THE PREFERRED EMBODIMENT

Figure 1:
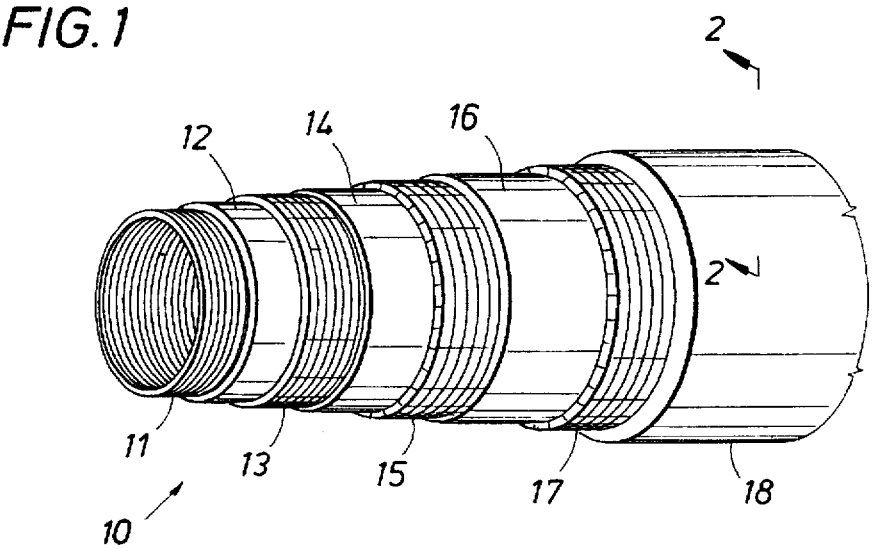
FIG. 1 is a perspective view, partially broken away, illustrating the end of a multilayer, flexible conduit constructed in accordance with the teachings of the present invention.

With reference to FIG. 1, a conduit constructed in accordance with the teachings of the present invention is indicated generally at 10. The conduit 10 is formed of multiple, overlying layers of steel, polymeric, and elastomeric materials that provide structural strength against internal and external pressure differentials across the conduit wall, provide tensile strength to the conduit, and seal the inner areas of the conduit from the external environment. Thus, the conduit 10 includes a collapse-resistant layer 11 at its center and an overlying fluid barrier 12. A hoop strength layer 13, constructed in accordance with the teachings of the present invention, overlies the fluid barrier 12. An anti-wear layer 14 separates the hoop strength layer 13 from a tensile strength layer 15, which in turn is overlain by a second anti-wear layer 16 that separates the tensile strength layer 15 from a second tensile strength layer 17. The conduit 10 is enclosed within an external tubular fluid barrier 18.

Figure 2:
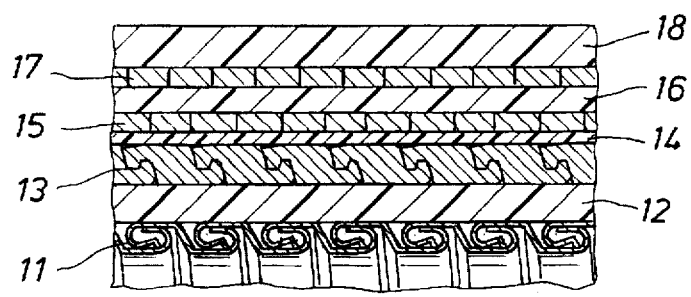
FIG. 2 is a vertical cross-sectional view, partially broken away, taken along the line 2—2 of FIG. 1, illustrating the layered construction of the conduit of FIG. 1.

The collapse-resistant layer 11 is a corrugated metallic tube that is fabricated from a preformed metallic strip wound around a mandril. Adjacent edges of the metallic strip are interlocked, as illustrated in FIG. 2. This layer 11 of the conduit 10 supports the overlying fluid barrier 12 and prevents collapse from hydrostatic pressure or other crushing loads applied externally against the pipe.

A flexible layer of polymer material forming the layer 12 is extruded over the collapse-resistant layer 11 to seal the conduit against fluids carried through the tube body. The hoop strength layer 13, as the layer 11, is also helically wound to form a continuous, interlocking wall. The layer 13 resists the forces exerted against the fluid barrier 12 as a result of the pressure within the tube being greater than that externally of the fluid barrier 12. As will hereinafter be more fully described, the configuration of the material forming the hoop strength layer 13 is made in accordance with the teachings of the present invention to resist service-induced wear and stress. The layer 14 is a thin polymer layer applied between the two adjacent armor layers 13 and 15 to prevent metal-to-metal contact and reduce wear.

The layers 15 and 17 are counterwound layers disposed helically over the surface of the conduit 10 to provide resistance against internal pressure and axial tension. The counterwinding of the two layers balances the twisting forces imposed on the conduit when placed in tension. The external layer 18 of the conduit 10 is a polymer material that is applied to resist mechanical damage and intrusion of external materials, such as seawater.

Figure 3:
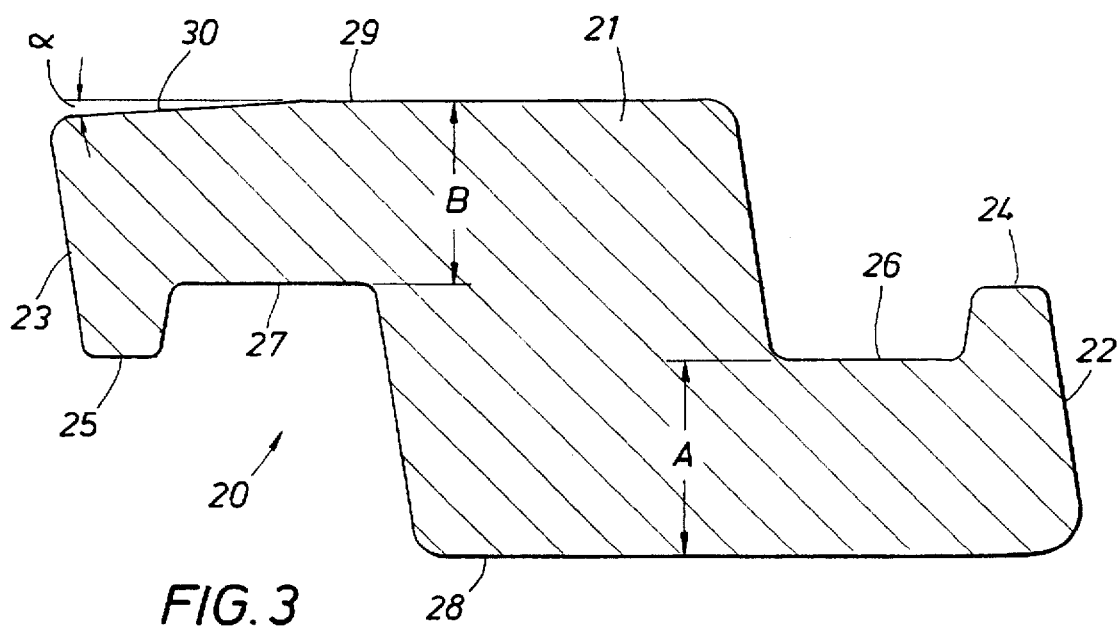
FIG. 3 is an enlarged cross-sectional view of the Z-shaped profile of the band of the present invention.

Details in the construction of the band employed in the hoop strength layer 13 may be seen by reference to FIG. 3, in which the Z-shaped profile of the elongate band employed in forming the layer 13 is indicated generally at 20. The profile of the band 20 includes a main body section 21 interposed between a leading edge 22 and a trailing edge 23. The profile includes a leading edge hook 24 and a trailing edge hook 25. A leading edge valley 26 is disposed between the main body 21 and the hook 24. A trailing edge valley 27 is disposed between the main body 21 and the trailing edge hook 25. The profile of the band 20 has a surface 28 that forms the inner surface of the tubular body formed when the band is helically wound and an outer surface 29 that forms the external surface of the helically wound tube. The outer surface 29 has a tapering section 30 that tapers toward the inner surface in a direction from the main body toward the trailing edge 23, as illustrated.

As may be seen by reference to FIG. 3, the thickness A of the profile of the band 20 between the valley 26 and the inner surface 28 is greater than the thickness B between the valley 27 and the outer surface 29. This dimensional difference, which is one of the features making the profile asymmetric, provides a stiffer structural body section in the area of the dimension A than does a conventional S-shaped design. The thicker body section resists twisting when a band of the material is helically wound into the tubular form 13 and the resulting conduit, pressure loaded. As compared with a symmetrical configuration, the amount of material present in the area where the twisting moment occurs is significantly greater to reduce contact pressure between an engaged hook and valley and thereby decrease wear and alternating stress at the valley corners. Increasing the dimension A also effectively moves the external contact point of the adjacent trailing edge hook in the valley 26 to a point radially more distant from the centerline of the helical tube. The result is a reduction in the compressive force exerted by the radially inwardly directed force exerted at the base of the trailing edge hook 25 in the valley 26. Reduction of stress in this area further reduces the contact stresses, reducing wear and alternating stresses and thus increasing the life of the hoop strength layer.

Another dimensional change made in the cross-sectional profile of the band 20 is indicated by the tapering surface 30. As illustrated, the surface 30 tapers at an angle α away from the plane of the outer surface 29 overlying the main body section 21. Tapering of the surface 30 reduces the effect on the profile of radially inwardly directed bearing pressure exerted by the overlying tension layers 15 and 17, or other overlying layers, to protect the relatively narrow section of the profile. Again, reduction of the cyclical stress forces in the reduced thickness area of the profile protects the valley corners from excessive stress to extend the operative life of the band before the onset of metal fatigue.

While the hoop strength band of the present invention has been described for use in a flexible conduit having the specific layered configuration illustrated in FIG. 1, it will be appreciated that the features of the invention are useful in any helically wound conduit, including a single layer conduit. Moreover, it will further be appreciated that while the materials of construction of the band 20 have been indicated as being metal, the material may be any suitable material that is capable of providing the required physical characteristics for a given application. Depending on the environment to be encountered, the material of the band 20 may preferably be carbon steel, stainless steel, or another metal alloy. In some applications, the material of the hoop strength band may be a plastic or other non-metal material.

While construction of the hoop strength layer of the invention has been described using a single band, it will also be understood that the hoop strength layer may be constructed by simultaneously winding two or more adjacent bands having the asymmetrical Z-shaped profile of the present invention.

The foregoing description and examples illustrate selected embodiments of the present invention. In light thereof, variations and modifications will be suggested to one skilled in the art, all of which are in the spirit and purview of this invention.

What is claimed is:

1. A building component for forming a wall of a flexible conduit, comprising:

an elongate band of material having a substantially radially asymmetrical Z-shaped cross-sectional profile, said profile having a leading edge and a trailing edge whereby said band may be helically wound in a plurality of successive winding turns to form a wall of said conduit, with said trailing edge of one winding turn adapted to overlie and lock to said leading edge of a previous adjacent winding turn.

2. The building component as defined in claim 1 wherein said Z-shaped profile includes:

a hook on said leading edge and a hook on said trailing edge;

a main body interposed between said leading edge hook and said trailing edge hook;

a leading edge valley interposed between said leading edge hook and said main body;

a trailing edge valley interposed between said trailing edge hook and said main body;

an inner surface adapted to form a radially inner part of said conduit wall; and an outer surface adapted to form a radially outer surface of said conduit wall.

3. The building component as defined in claim 2 wherein said outer surface tapers toward said inner surface in a direction toward said trailing edge.

4. The building component as defined in claim 1 wherein said material comprises a metal.

5. The building component as defined in claim 1 wherein said material comprises stainless steel.

6. The building material as defined in claim 1 wherein said material comprises steel.

7. The building component as defined in claim 1 wherein said material comprises a metal alloy.

8. A flexible conduit comprising at least one elongate, helically wound band of material wound in a plurality of winding turns to form a tubular body, said band of material having a radially asymmetrical Z-shaped cross-sectional profile.

9. The flexible conduit as defined in claim 8 wherein said Z-shaped profile has a leading edge and a trailing edge and said band is helically wound with said trailing edge of one winding turn overlying and locking to said leading edge of a previous adjacent winding turn.

10. The flexible conduit as defined in claim 9 wherein said Z-shaped profile includes:

a hook on said leading edge and a hook on said trailing edge;

a main body interposed between said leading edge hook and said trailing edge hook;

a leading edge valley interposed between said leading edge hook and said main body;

a trailing edge valley interposed between said trailing edge hook and said main body;

an inner surface adapted to form a radially inner part of said conduit wall; and an outer surface adapted to form a radially outer surface of said conduit wall.

11. The flexible conduit as defined in claim 9 wherein said outer surface tapers toward said inner surface in a direction toward said trailing edge.

12. The flexible conduit as defined in claim 10 wherein said outer surface tapers toward said inner surface in a direction toward said trailing edge.

13. The flexible conduit as defined in claim 8, wherein said material comprises a metal.

14. The flexible conduit as defined in claim 8 wherein said material comprises stainless steel.

15. The flexible conduit as defined in claim 8 wherein said material comprises steel.

16. The flexible conduit as defined in claim 8 wherein said material comprises a metal alloy.

17. The flexible conduit as defined in claim 8, further including at least one layer of pressure sealing material concentric with said tubular body.

18. The flexible conduit as defined in claim 17 wherein:

said tubular body comprises a burst-resistant metal layer for providing hoop strength to said conduit; and a tubular fluid barrier is disposed intermediate said metal layer and a central opening through said tubular body.

19. The flexible conduit as defined in claim 8, further including:

a central, flexible collapse-resistant layer;

a first fluid barrier overlying said collapse-resistant layer;

a burst-resistant hoop strength layer, comprising said tubular body, overlying said fluid barrier; and a tensile strength layer concentric with said tubular body.

20. The flexible conduit as defined in claim 19, further including a second fluid barrier overlying said first fluid barrier.

21. A building component for forming a wall of a flexible conduit, comprising:

an elongated band of material having a substantially asymmetrical Z; shaped cross-sectional profile, said profile having a leading edge and a trailing edge whereby said band may be helically wound in a plurality of successive winding turns to form a wall of said conduit, with said trailing edge of one winding turn adapted to overlie and lock to said leading edge of a previous adjacent winding turn, said Z-shaped profile including a hook on said leading edge and a hook on said trailing edge;

a main body interposed between said leading edge hook and said trailing edge hook;

a leading edge valley interposed between said leading edge hook and said main body;

a trailing edge valley interposed between said trailing edge hook and said main body;

an inner surface adapted to form a radially inner part of said conduit wall; and an outer surface adapted to form a radially outer surface of said conduit wall; said profile being thicker between said inner surface and said leading edge valley than between said outer surface and said trailing edge valley.

22. The building component as defined in claim 21 wherein said outer surface tapers towards said inner surface in a direction toward said trailing edge.

23. A flexible conduit, comprising:

at least one elongate, helically wound band of material wound in a plurality of winding turns to form a tubular body, each of said bands of material having an asymmetrical Z-shaped cross-sectional profile, wherein said Z-shaped profile has a leading edge and a trailing edge and said band is helically wound with said trailing edge of one winding turn overlying and locking to said leading edge of a previous adjacent winding turn, said Z-shaped profile including a hook on said leading edge and a hook on said trailing edge;

a main body interposed between said leading edge hook and said trailing edge hook;

a leading edge valley interposed between said leading edge hook and said main body;

a trailing edge valley interposed between said trailing edge hook and said main body;

an inner surface adapted to form a radially inner part of said conduit wall; and said profile being thicker between said inner surface and skid leading edge valley than between said outer surface and said trailing edge valley.

\* \* \* \* \*

UNITED STATES PATENT AND TRADEMARK OFFICE
CERTIFICATE OF CORRECTION

PATENT NO.   : 5,730,188
DATED        : March 24, 1998
INVENTOR(S)  : Mark D. Kalman and Bin Chen It is certified that error appears in the above-identified patent and that said Letters Patent is hereby corrected as shown below:

In column 6, line 48, delete "Z; shaped" and insert therefor --Z-shaped--.

In column 8, line 10, delete "skid" and insert therefor --said--.

Signed and Sealed this

Second Day of June, 1998

Attest:

BRUCE LEHMAN

Attesting Officer

Commissioner of Patents and Trademarks